(12) United States Patent
Hong

(10) Patent No.: US 11,610,491 B2
(45) Date of Patent: Mar. 21, 2023

(54) DATA TRANSMISSION METHOD AND APPARATUS, AND UNMANNED AERIAL VEHICLE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 379 days.

(21) Appl. No.: 16/766,492

(22) PCT Filed: Dec. 8, 2017

(86) PCT No.: PCT/CN2017/115235
§ 371 (c)(1),
(2) Date: May 22, 2020

(87) PCT Pub. No.: WO2019/109339
PCT Pub. Date: Jun. 13, 2019

(65) Prior Publication Data
US 2020/0380872 A1 Dec. 3, 2020

(51) Int. Cl.
*G08G 5/00* (2006.01)
*H04W 4/40* (2018.01)
(Continued)

(52) U.S. Cl.
CPC ......... *G08G 5/0013* (2013.01); *G08G 5/0069* (2013.01); *H04B 7/18506* (2013.01);
(Continued)

(58) Field of Classification Search
CPC ............... G08G 5/0013; G08G 5/0069; H04B 7/18506; H04W 4/40; H04W 36/00837; H04W 36/30; H04W 4/70; H04W 36/0083
See application file for complete search history.

(56) References Cited

U.S. PATENT DOCUMENTS 5,887,023 A * 3/1999 Mabuchi ................ H04B 1/713
370/204
9,220,086 B2 * 12/2015 Wang ..................... H04W 40/12
(Continued)

FOREIGN PATENT DOCUMENTS

CN       104395778 A       3/2015
CN       105052203 A       11/2015
(Continued)

OTHER PUBLICATIONS

Supplementary European Search Report in European Application No. 17933980.9, dated Nov. 11, 2020.
(Continued)

*Primary Examiner* — Ivan O Latorre
(74) *Attorney, Agent, or Firm* — Finnegan, Henderson, Farabow, Garrett & Dunner, L.L.P.

(57) ABSTRACT

A data transmission method includes: determining link quality of a first link between an unmanned aerial vehicle and an unmanned aerial vehicle controller, link quality of a second link between the unmanned aerial vehicle and a base station, and link quality of a third link between the base station and the unmanned aerial vehicle controller; and determining one or more data transmission links for data to be transmitted, based on the link quality of the first link, the link quality of the second link, and the link quality of the third link.

17 Claims, 5 Drawing Sheets

(51) Int. Cl.
*H04W 36/00* (2009.01)
*H04B 7/185* (2006.01)
*H04W 36/30* (2009.01)

(52) U.S. Cl.
CPC ....... *H04W 4/40* (2018.02); *H04W 36/00837* (2018.08); *H04W 36/30* (2013.01)

(56) References Cited

U.S. PATENT DOCUMENTS

| | | | |
|---|---|---|---|
| 9,306,657 B2* | 4/2016 | de La Chapelle | H01Q 1/283 |
| 10,694,429 B2* | 6/2020 | Russell | H04W 36/0027 |
| 11,166,208 B2* | 11/2021 | Takács | H04W 36/00837 |
| 2007/0284474 A1 | 12/2007 | Olson et al. | |
| 2010/0224732 A1 | 9/2010 | Olson et al. | |
| 2015/0230150 A1* | 8/2015 | Wang | H04W 72/02 |
| | | | 370/252 |
| 2015/0230207 A1* | 8/2015 | Wang | H04N 7/185 |
| | | | 370/329 |
| 2016/0029243 A1 | 1/2016 | Seino | |
| 2016/0073378 A1 | 3/2016 | Wang et al. | |
| 2017/0069214 A1* | 3/2017 | Dupray | H04B 7/18506 |
| 2017/0099625 A1* | 4/2017 | Li | H04W 28/08 |
| 2017/0118688 A1 | 4/2017 | Guvenc | |
| 2017/0251515 A1* | 8/2017 | Altman | H04L 43/20 |
| 2017/0351254 A1* | 12/2017 | Listwin | G05D 1/0022 |
| 2018/0270679 A1* | 9/2018 | Laselva | H04W 36/0088 |
| 2019/0059125 A1 | 2/2019 | Li et al. | |
| 2019/0081766 A1* | 3/2019 | Luo | H04B 1/525 |
| 2019/0384279 A1* | 12/2019 | Song | H04W 36/0011 |
| 2020/0209844 A1* | 7/2020 | Liu | H04L 67/12 |

FOREIGN PATENT DOCUMENTS

| | | |
|---|---|---|
| CN | 105682158 A | 6/2016 |
| CN | 105764079 A | 7/2016 |
| CN | 106716871 A | 5/2017 |
| CN | 106878672 A | 6/2017 |
| CN | 107079365 A | 8/2017 |
| CN | 107248881 A | 10/2017 |
| CN | 107380443 A | 11/2017 |
| CN | 107396426 A | 11/2017 |
| WO | WO 2017/114496 A1 | 7/2017 |

OTHER PUBLICATIONS

International Search Report in the International Application No. PCT/CN2017/115235, dated Apr. 4, 2018.
English translation of the Written Opinion of the International Search Authority in the International Application No. PCT/CN2017/115235, dated Apr. 4, 2018.
First Office Action of the Chinese Application No. 201780002119.4, dated Mar. 30, 2020.
Dorin Rautu et al, "Maintaining a permanent connectivity between nodes of an air-to-ground communication network", IEEE 2017 13th International Wireless Communications and Mobile Computing Conference (IWCMC)—Valencia, Spain (Jun. 26, 2017-Jun. 30, 2017), 681-686. doi:10.1109/IWCMC.2017.7986367.
Wang Zhiming, "Study on Key Technologies of Networking and Transmission in Transoceanic Civil Aeronautical Communication", College of Communication Engineering of Chongqing University, Chongqing, China, Oct. 2015, China Academic Journal Electronic Publishing House, 127 pgs.
Notification to Grant Patent Rights for Invention of Chinese Application No. 201780002119.4, dated Jul. 28, 2021.

* cited by examiner

DATA TRANSMISSION METHOD AND APPARATUS, AND UNMANNED AERIAL VEHICLE

CROSS REFERENCE TO RELATED APPLICATIONS

This application is a national phase application based on PCT/CN2017/115235, filed Dec. 8, 2017, the content of which is incorporated herein by reference.

TECHNICAL FIELD

The present disclosure generally relates to the technical field of communication, and more particularly, to a data transmission method and apparatus and an unmanned aerial vehicle (UAV).

BACKGROUND

An unmanned aerial vehicle is referred to as UAV, which has been applied to some specific scenarios to execute tasks such as high-altitude photographing, unmanned detection and reconnaissance, surveying and mapping, highway surveying, urban planning, ecological environmental protection monitoring, scientific investigation, oil exploration, aerial remote sensing, frontier patrolling, forest fire protection and disaster assessment.

For further extending the application range of UAVs, the 3rd Generation Partnership Project (3GPP) proposes researches on more standardized provision of required service for UAVs by cellular networks in discussions about a project "enhanced support for aerial vehicles". In a related art, data is usually transmitted between a UAV and a UAV controller through a Wireless-Fidelity (WIFI) network. The WIFI network has the problems of channel occupation, great interference, limited coverage and the like, and thus data transmission performance between the UAV and the UAV controller is relatively low. Cellular-network-based data transmission has the characteristics that continuous coverage may be achieved and data transmission is guaranteed. However, the technical problem of how to control a UAV to transmit data to a UAV controller through an uplink in a cellular network and a WIFI network has yet not been solved in the related art.

SUMMARY

For solving the problem in the related art, embodiments of the present disclosure provide a data transmission method and apparatus and a UAV, to improve data transmission efficiency between a UAV controller and a UAV through two networks, i.e., a WIFI network and a cellular network.

According to a first aspect of the embodiments of the present disclosure, a data transmission method is provided, which may include that:

link quality of a first link between a UAV and a UAV controller, link quality of a second link between the UAV and a base station, and link quality of a third link between the base station and the UAV controller are determined, the first link being a WIFI network communication link and each of the second link and the third link being a mobile network communication link; and one or more data transmission links for data to be transmitted is determined based on the link quality of the first link, the link quality of the second link, and the link quality of the third link.

In an embodiment, the operation that the one or more data transmission links for the data to be transmitted is determined based on the link quality of the first link, the link quality of the second link and the link quality of the third link may include that:

when the link quality of the first link is greater than a first threshold, the WIFI network communication link is determined as the data transmission link;

when the link quality of the first link is less than the first threshold and greater than a second threshold, the link quality of the second link is greater than a third threshold and not greater than a fourth threshold and the link quality of the third link is greater than a fifth threshold and not greater than a sixth threshold, the WIFI network communication link and the mobile network communication link are determined as the data transmission links; or when the link quality of the first link is less than the second threshold, the link quality of the second link is greater than the fourth threshold and the link quality of the third link is greater than the sixth threshold, the mobile network communication link is determined as the data transmission link.

In an embodiment, the first threshold, the second threshold, the third threshold, the fourth threshold, the fifth threshold and the sixth threshold may be set by the base station; or, the first threshold, the second threshold, the third threshold, the fourth threshold, the fifth threshold and the sixth threshold may be set by the UAV controller.

In an embodiment, the operation that the one or more data transmission links for the data to be transmitted is determined based on the link quality of the first link, the link quality of the second link and the link quality of the third link may include that:

when a data volume of the data to be transmitted is greater than a first volume threshold, the WIFI network communication link and the mobile network communication link are determined as the data transmission links;

when the data volume of the data to be transmitted is not greater than the first volume threshold, the link quality of the first link, the link quality of the second link and the link quality of the third link are compared;

when both of the link quality of the second link and the link quality of the third link are greater than or equal to the link quality of the first link, the mobile network communication link is determined as the data transmission link; or when at least one of the link quality of the second link or the link quality of the third link is not greater than or equal to the link quality of the first link, the WIFI network communication link is determined as the data transmission link.

In an embodiment, the method may further include that:

when each of the WIFI network communication link and the mobile network communication link is determined as the data transmission link, the data to be transmitted is divided into two sets of data according to a set proportion; and one set of the two sets of data is sent to the UAV controller through the first link, and another set of the two sets of data is sent to the base station through the second link so that the base station further sends the another set of the two sets of data to the UAV controller through the third link.

In an embodiment, the set proportion may be set by the UAV controller.

In an embodiment, the operation that the link quality of the third link between the base station and the UAV controller is determined may include that:

the link quality of the third link is received from the UAV controller.

According to a second aspect of the embodiments of the present disclosure, a data transmission apparatus is provided, which may include:

a first determination module, configured to determine link quality of a first link between a UAV and a UAV controller, link quality of a second link between the UAV and a base station, and link quality of a third link between the base station and the UAV controller, the first link being a WIFI network communication link and each of the second link and the third link being a mobile network communication link; and a second determination module, configured to determine one or more data transmission links based on the link quality of the first link, the link quality of the second link and the link quality of the third link.

In an embodiment, the second determination module may include:

a first determination submodule, configured to, when the link quality of the first link is greater than a first threshold, determine the WIFI network communication link as the data transmission link;

a second determination submodule, configured to, when the link quality of the first link is less than the first threshold and greater than a second threshold, the link quality of the second link is greater than a third threshold and not greater than a fourth threshold and the link quality of the third link is greater than a fifth threshold and not greater than a sixth threshold, determine the WIFI network communication link and the mobile network communication link as the data transmission links; or a third determination submodule, configured to, when the link quality of the first link is less than the second threshold, the link quality of the second link is greater than the fourth threshold and the link quality of the third link is greater than the sixth threshold, determine the mobile network communication link as the data transmission link.

In an embodiment, the first threshold, the second threshold, the third threshold, the fourth threshold, the fifth threshold and the sixth threshold may be set by the base station; or, the first threshold, the second threshold, the third threshold, the fourth threshold, the fifth threshold and the sixth threshold may be set by the UAV controller.

In an embodiment, the second determination module may include:

a fourth determination submodule, configured to, when a data volume of data to be transmitted is greater than a first volume threshold, determine the WIFI network communication link and the mobile network communication link as the data transmission links;

a comparison submodule, configured to, when the data volume of the data to be transmitted is not greater than the first volume threshold, compare the link quality of the first link, the link quality of the second link and the link quality of the third link;

a fifth determination submodule, configured to, when both of the link quality of the second link and the link quality of the third link are greater than or equal to the link quality of the first link, determine the mobile network communication link as the data transmission link; or a sixth determination submodule, configured to, when at least one of the link quality of the second link or the third link is not greater than or equal to the link quality of the first link, determine the WIFI network communication link as the data transmission link.

In an embodiment, the apparatus may further include:

a grouping module, configured to, when the WIFI network communication link and the mobile network communication link are determined as the data transmission links, divide the data to be transmitted into two sets of data according to a set proportion; and a sending module, configured to send one set of the two sets of data to the UAV controller through the first link and send another set the two sets of data to the base station through the second link so that the base station further sends the another set of the two sets of data to the UAV controller through the third link.

In an embodiment, the set proportion may be set by the UAV controller.

In an embodiment, the first determination module may be configured to receive the link quality of the third link from the UAV controller.

According to a third aspect of the embodiments of the present disclosure, a UAV is provided, which may include:

a processor; and a memory configured to store an instruction executable by the processor, wherein the processor may be configured to:

determine link quality of a first link between the UAV and a UAV controller, link quality of a second link between the UAV and a base station, and link quality of a third link between the base station and the UAV controller, the first link being a WIFI network communication link and each of the second link and the third link being a mobile network communication link; and determine one or more data transmission link based on the link quality of the first link, the link quality of the second link, and the link quality of the third link.

According to a fourth aspect of the embodiments of the present disclosure, a non-transitory computer-readable storage medium is provided, in which computer instructions may be stored, the instructions being executed by a processor to implement the following operations:

link quality of a first link between a UAV and a UAV controller, link quality of a second link between the UAV and a base station, and link quality of a third link between the base station and the UAV controller are determined, the first link being a WIFI network communication link and each of the second link and the third link being a mobile network communication link; and one or more data transmission link is determined based on the link quality of the first link, the link quality of the second link and the link quality of the third link.

The technical solutions provided in the embodiments of the present disclosure may have the following beneficial effects.

A mobile network and a WIFI network accessed by the UAV are two independent communication networks. Through the technical solutions of the embodiments, the UAV may dynamically regulate the one or more data transmission links to send the data to be transmitted based on the link quality of the first link between the UAV and the UAV controller, the link quality of the second link between the UAV and the base station, and the link quality of the third link between the base station and the UAV controller, so that resources of the mobile network and the WIFI network accessed by the UAV may be fused better, and the problem of relatively low data transmission performance caused by data transmission between the UAV and the UAV controller through the WIFI network in the related art is solved.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1A:
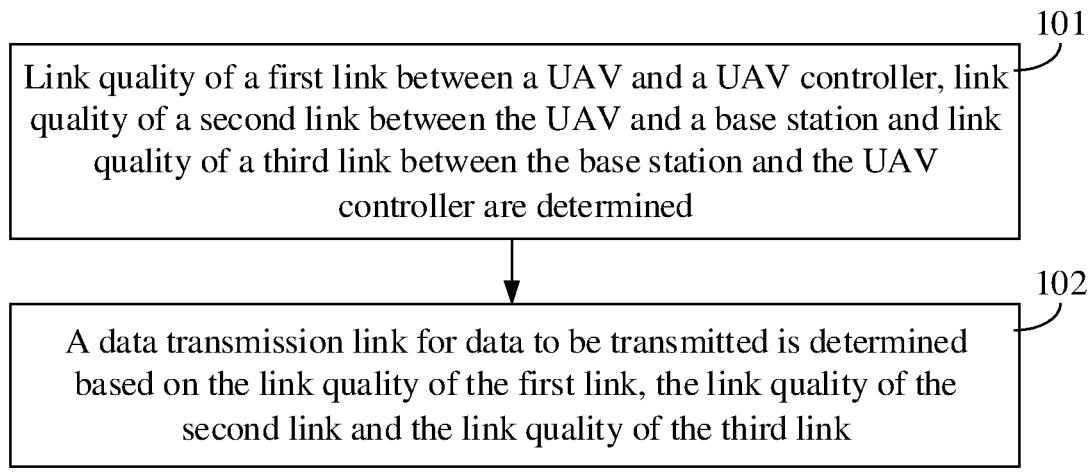
FIG. 1A is a flow chart showing a data transmission method, according to an exemplary embodiment.
Figure 1B:
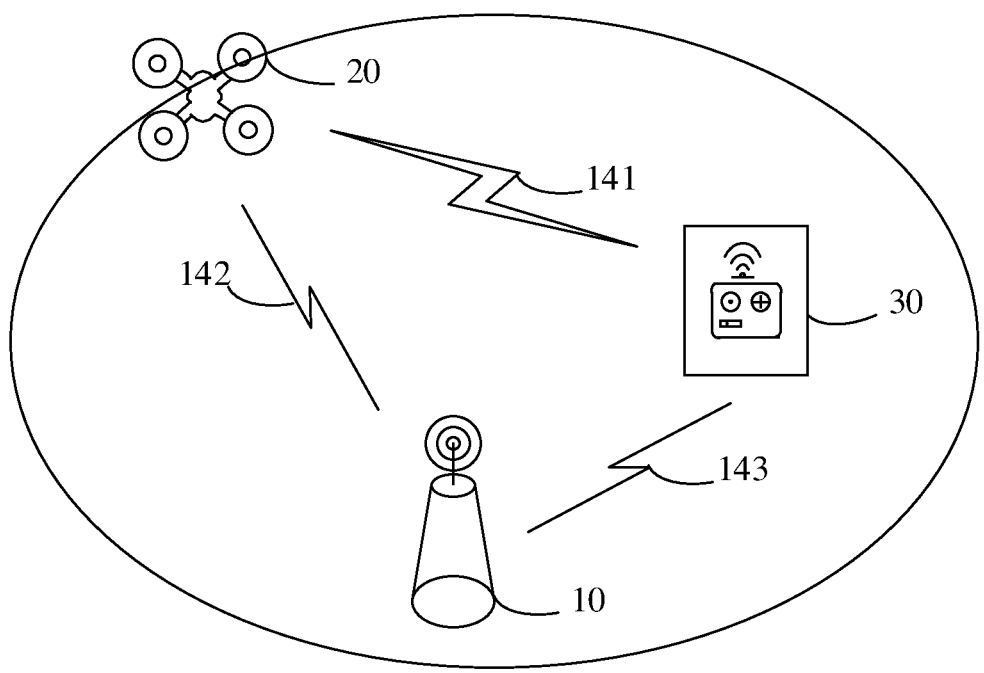
FIG. 1B is a scenario diagram of a data transmission method, according to an exemplary embodiment.

FIG. 1A is a flow chart showing a data transmission method, according to an exemplary embodiment. FIG. 1B is a scenario diagram of a data transmission method, according to an exemplary embodiment. The data transmission method may be applied to a UAV. As shown in FIG. 1A, the data transmission method includes the following operations 101-102.

In operation 101, link quality of a first link between the UAV and a UAV controller, link quality of a second link between the UAV and a base station, and link quality of a third link between the base station and the UAV controller are determined.

In an embodiment, the first link is a WIFI network communication link, and the UAV may directly send data to the UAV controller through the first link in a WIFI network. In an embodiment, each of the second link and the third link is a mobile network communication link, and the UAV may send the data to the base station through the second link in a mobile network for the base station to further send the data to the UAV controller through the third link.

In an embodiment, for the first link and the second link, the UAV may detect signal power of reference signals transmitted in the first link and the second link to determine the link quality of the corresponding links. In an embodiment, for the third link, the UAV may receive the link quality of the third link from the UAV controller, and the UAV controller may periodically send the link quality of the third link to the UAV and may also send the link quality of the third link to the UAV when receiving a request sent by the UAV to acquire the link quality of the third link.

In operation 102, one or more data transmission links for data to be transmitted are determined based on the link quality of the first link, the link quality of the second link and the link quality of the third link.

In an embodiment, the data to be transmitted may be a data packet cached in a Packet Data Convergence Protocol (PDCP) buffer of the UAV and required to be sent to the UAV controller.

In an embodiment, since the WIFI network is a free network and the mobile network is a billing network, when the link quality of the first link is relatively high, the WIFI network communication link, i.e., the first link, is preferably determined as the data transmission link, and when the link quality of the first link is relatively low and both of the link quality of the second link and the link quality of the third link are relatively high, the WIFI network communication link and the mobile network communication link, i.e., the first link and the second link, may be determined as the data transmission links, or only the mobile network communication link is determined as the data transmission link. A specific implementation manner for determining the one or more data transmission links for the data to be transmitted based on the link quality of the first link, the second link, and the third link may refer to descriptions in embodiments shown in FIG. 2 to FIG. 3 and is not elaborated herein.

In an embodiment, after the one or more data transmission links for the data to be transmitted are determined, the data to be transmitted may be sent through the transmission links.

In an exemplary scenario, as shown in FIG. 1B, exemplary descriptions are made with the condition that the mobile network is a Long Term Evolution (LTE) network and the base station is an Evolved Node B (eNB) as an example (the mobile network is not limited to the LTE network and may also be another cellular network such as 5th-Generation (5G)). The scenario shown in FIG. 1B includes the eNB 10, the UAV 20 and the UAV controller 30. The UAV 20 is in coverage of the eNB 10, and is in the same WIFI network with the UAV controller 30. Based on the link quality of the first link, the link quality of the second link, and the link quality of the third link, under one circumstance, the UAV 20 may transmit the data to the UAV controller 30 through the first link 141 in the WIFI network, and when the link quality of the first link 141 is relatively low, for improving data transmission efficiency of the UAV 20, part of data or all the data may be transmitted to the eNB 10 through the second link 142 and then the eNB 10 forwards the part of data or all the data to the UAV controller 30 through the third link 143. Efficiency of data transmission between the UAV 20 and the UAV controller 30 is effectively improved.

The mobile network and the WIFI network accessed by the UAV are two independent communication networks. Through operation 101 and operation 102 of the embodiment, the UAV may dynamically regulate the one or more data transmission links to send the data to be transmitted based on the link quality of the first link between the UAV and the UAV controller, the link quality of the second link between the UAV and the base station, and the link quality of the third link between the base station and the UAV controller, so that resources of the mobile network and the WIFI network accessed by the UAV may be fused better, and the problem of relatively low data transmission performance caused by data transmission between the UAV and the UAV controller through the WIFI network in the related art is solved.

Specifically, for how to transmit the data, reference may be made to the following embodiments.

The technical solution provided in the embodiment of the present disclosure will be described below with specific embodiments.

Figure 2:
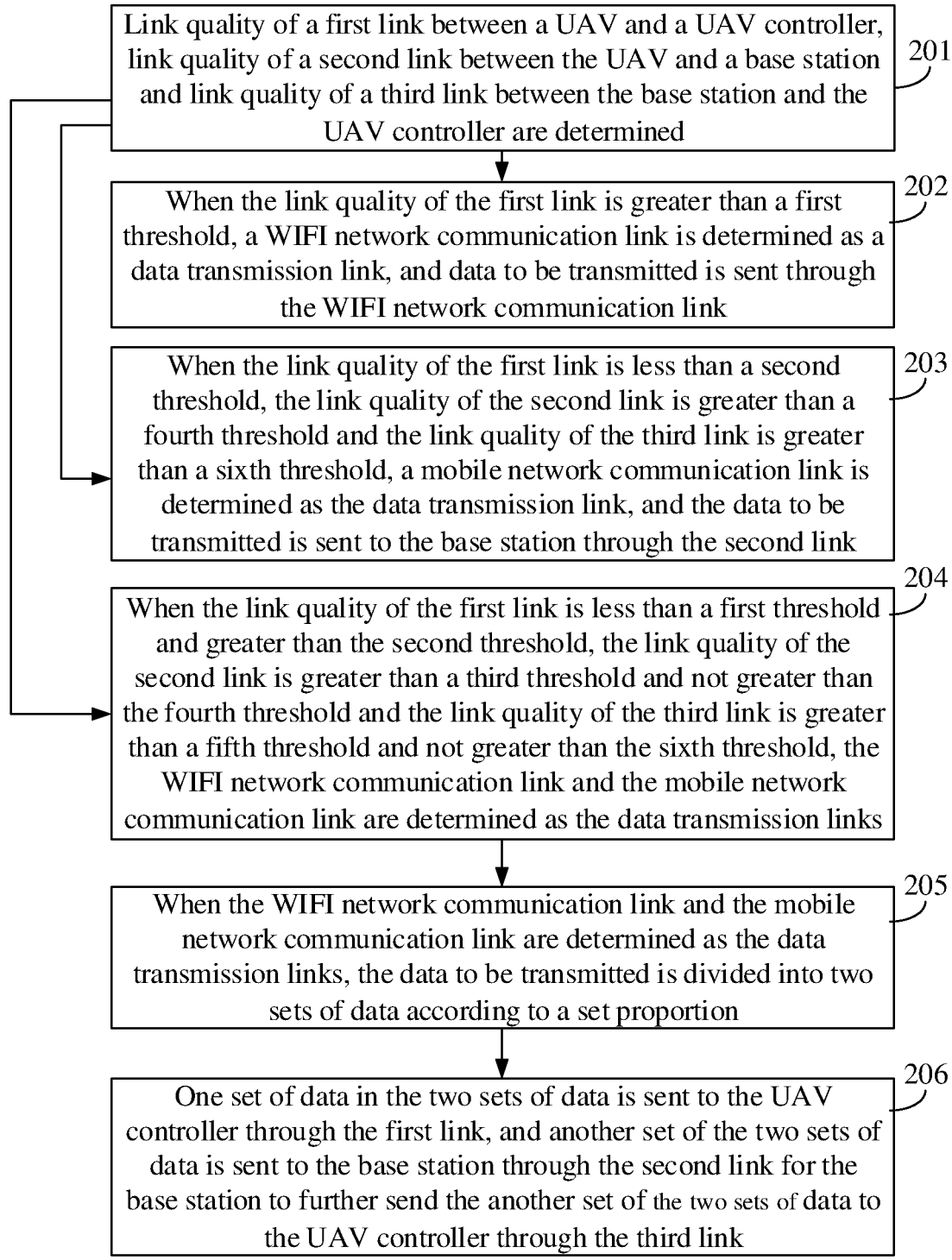
FIG. 2 is a flow chart showing another data transmission method, according to an exemplary embodiment.

FIG. 2 is a flow chart showing another data transmission method, according to an exemplary embodiment. In the embodiment, exemplary descriptions are made by use of the method provided in the embodiment of the present disclosure in combination with FIG. 1B with the condition that a UAV determines one or more data transmission links based on link quality of a first link, a second link, and a third link and transmits data as an example. As shown in FIG. 2, the following operations are included.

In operation 201, link quality of a first link between a UAV and a UAV controller, link quality of a second link between the UAV and a base station, and link quality of a third link between the base station and the UAV controller are determined, and according to the link quality of the first link, the link quality of the second link, and the link quality of the third link, operation 202, or operation 203, or operation 204 is correspondingly executed.

In operation 202, when the link quality of the first link is greater than a first threshold, a WIFI network communication link is determined as a data transmission link, data to be transmitted is sent through the WIFI network communication link, and the flow ends.

In an embodiment, the first threshold may be a relatively great numerical value. For example, the first threshold is −60 dB. That the link quality of the first link is greater than the first threshold may be used to indicate that a WIFI network is high enough in signal quality to transmit service data of the UAV, so that only the first link corresponding to the WIFI network is determined as the transmission link.

In operation 203, when the link quality of the first link is less than a second threshold, the link quality of the second link is greater than a fourth threshold and the link quality of the third link is greater than a sixth threshold, a mobile network communication link is determined as the data transmission link, the data to be transmitted is sent to the base station through the second link, and the flow is ended.

In an embodiment, that the link quality of the first link is less than the second threshold is used to indicate that the WIFI network is relatively poor in signal quality and low in data transmission rate, and that the link quality of the second link is greater than the fourth threshold and the link quality of the third link is greater than the sixth threshold is used to indicate that the mobile network communication link is high in signal quality, so that only the mobile network communication link is determined as the data transmission link to avoid data loss during data transmission through the WIFI network.

In operation 204, when the link quality of the first link is less than a first threshold and greater than the second threshold, the link quality of the second link is greater than a third threshold and not greater than the fourth threshold and the link quality of the third link is greater than a fifth threshold and not greater than the sixth threshold, the WIFI network communication link and the mobile network communication link are determined as the data transmission links.

In an embodiment, the second threshold is a numerical value less than the first threshold. For example, the second threshold is −80 dB. That the link quality of the first link is less than the first threshold and greater than the second threshold may be used to indicate that the WIFI network is neither high nor low in signal quality and can be used to transmit the service data of the UAV but the data transmission rate may be relatively low. In an embodiment, the third threshold is a numerical value less than the fourth threshold, the fifth threshold is a numerical value less than the sixth threshold, and that the link quality of the second link is greater than the third threshold and not greater than the fourth threshold and the link quality of the third link is greater than the fifth threshold and not greater than the sixth threshold may be used to indicate that the mobile network is relatively high in signal quality. Therefore, for improving data transmission efficiency of the data to be transmitted, the data to be transmitted may be transmitted through both the mobile network and the WIFI network.

In an embodiment, the first threshold, the second threshold, the third threshold, the fourth threshold, the fifth threshold, and the sixth threshold may be set by the base station. In an embodiment, the first threshold, the second threshold, the third threshold, the fourth threshold, the fifth threshold, and the sixth threshold may also be sent by the UAV controller.

In an embodiment, the third threshold may be the same as the fifth threshold, and the fourth threshold may be the same as the sixth threshold.

In operation 205, when the WIFI network communication link and the mobile network communication link are determined as the data transmission links, the data to be transmitted is divided into two sets of data according to a set proportion.

In an embodiment, the set proportion may be set by the UAV controller. The set proportion may be a fixed value, for example, 2:1. The set proportion may also be determined based on link quality of the WIFI network communication link and link quality of the mobile network communication link. For example, if the link quality of the WIFI network communication link is similar to the link quality of the mobile network communication link, the set proportion may be 1:1; if the link quality of the WIFI network communication link is much higher than the link quality of the mobile network communication link, the set proportion may be 3:1; and if the link quality of the WIFI network communication link is a little higher than the link quality of the mobile network communication link, the set proportion may be 3:2. The link quality of the mobile network communication link may be determined based on the link with relatively poor quality in the second link and the third link. For example, if the link quality of the second link is −80 dB and the link quality of the third link is −75 dB, it may be determined that the link quality of the mobile network communication link is −80 dB.

In an embodiment, the data to be transmitted may be grouped by taking bit as a unit. For example, the data of first-half bits of the data to be transmitted is divided into one set of data, and the data of second-half bits is divided into the other set of data. For example, first 6 bits in 12 bits may be divided into one set of data in the present disclosure, and the last 6 bits are divided into the other set of data in the present disclosure.

In operation 206, one set of the two sets of data is sent to the UAV controller through the first link, and another set of the two sets of data is sent to the base station through the second link for the base station to further send the another set of the two sets of data to the UAV controller through the third link.

In an embodiment, the specific data set to be sent to the base station through the mobile network communication link and the specific data set to be sent to the UAV controller through the WIFI network communication link may be determined based on the link quality of the WIFI network communication link and the link quality of the mobile network communication link. For example, when the link quality of the WIFI network communication link is higher than the link quality of the mobile network communication link, the data set in a large data volume may be sent to the UAV controller through the WIFI network communication link.

In an exemplary embodiment, as shown in FIG. 1B, under the circumstance that the UAV 20 may access both the mobile network and the WIFI network, if the link quality of the WIFI network communication link is high, only the WIFI network communication link is determined as the data transmission link to reduce cost in data transmission through the mobile network; if the link quality of the WIFI network communication link is neither high nor low and the link quality of the mobile network communication link is neither high nor low, both the WIFI network communication link and the mobile network communication link may be determined as data transmission links to ensure that the data of the UAV may be uploaded to the UAV controller rapidly; and if the link quality of the WIFI network communication link is relatively low and the link quality of the mobile network communication link is high, the mobile network communication link may be determined as the data transmission link. Therefore, it may be ensured that the UAV 20 may transmit the data to the UAV controller 30 through the most suitable data transmission link.

In the embodiment, the transmission link for data transmission of the UAV is regulated according to the link quality of the first link, the link quality of the second link, and the link quality of the third link, so that it may be ensured that the UAV may transmit the data through the best network, and data transmission performance of the UAV may be effectively improved.

Figure 3:
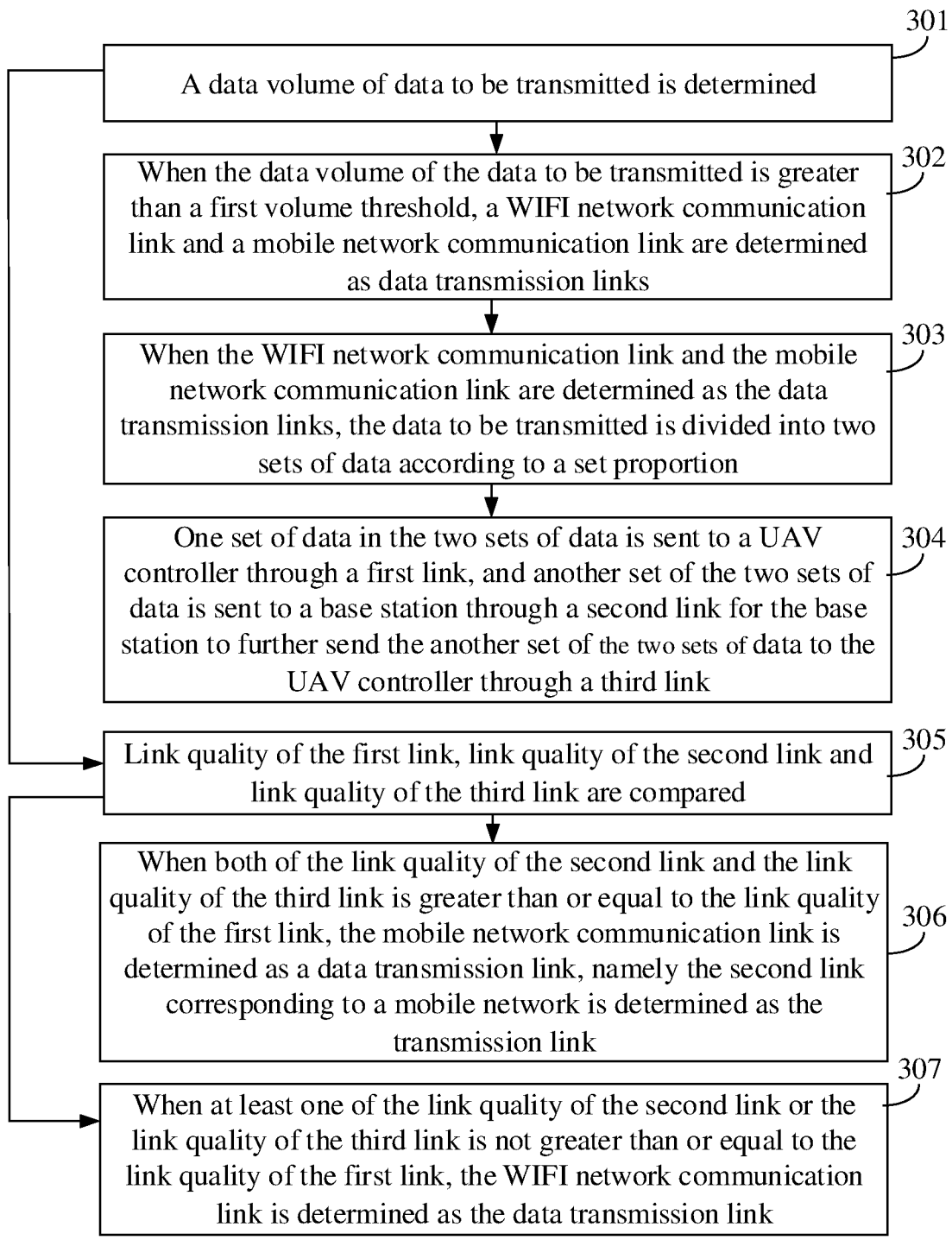
FIG. 3 is a flow chart showing another data transmission method, according to an exemplary embodiment.

FIG. 3 is a flow chart showing another data transmission method, according to an exemplary embodiment. In the embodiment, exemplary descriptions are made by use of the method provided in the embodiment of the present disclosure with the condition that a UAV determines one or more data transmission links based on a data volume of data to be transmitted of the UAV, link quality of a WIFI network communication link and link quality of a mobile network communication link and transmits the data as an example. As shown in FIG. 3, the following operations are included.

In operation 301, a data volume of data to be transmitted is determined, when the data volume of the data to be transmitted is greater than a first volume threshold, operation 302 is executed, and when the data volume of the data to be transmitted is not greater than the first volume threshold, operation 305 is executed.

In an embodiment, the data volume of the data to be transmitted may be obtained based on a data volume of data cached in a buffer. For example, the data volume is 12 bits. In an embodiment, the first volume threshold may be set by a UAV controller, and may usually not exceed a data volume of data that may be cached in the buffer.

In operation 302, a WIFI network communication link and a mobile network communication link are determined as data transmission links.

In an embodiment, when the data volume of the data to be transmitted is greater than the first volume threshold, it is indicated that the data volume of the data to be transmitted of the UAV is great, and for completely transmitting the data as fast as possible, the data is divided into two sets of data for sending through a first link and a second link respectively.

In operation 303, when the WIFI network communication link and the mobile network communication link are determined as the data transmission links, the data to be transmitted is divided into two sets of data according to a set proportion.

In operation 304, one set of the two sets of data is sent to a UAV controller through a first link, and another set of the two sets of data is sent to a base station through a second link for the base station to further send the another set of the two sets of data to the UAV controller through a third link.

In an embodiment, for description about operation 303 and operation 304, reference may be made to the description about operation 205 and operation 206 in the embodiment shown in FIG. 2 and elaborations are omitted herein.

In operation 305, link quality of the first link, link quality of the second link, and link quality of the third link are compared, when both of the link quality of both the second link and link quality of the third link are greater than or equal to the link quality of the first link, operation 306 is executed, and when at least one of the link quality of the second link or the link quality of the third link is not greater than or equal to the link quality of the first link, operation 307 is executed.

In an embodiment, when the data volume is less than the first volume threshold, it is indicated that there is less data to be transmitted, and thus the data may be transmitted through only one link. The link quality of the second link and the link quality of the third link are compared with the link quality of the first link to further select the link with higher signal quality to transmit the data. If both of the link quality of the second link and the link quality of the third link are higher than the link quality of the first link, it is indicated that link quality of the mobile network communication link is higher than link quality of the WIFI network communication link, and if at least one of the link quality of the second link or the link quality of the third link is lower than the link quality of the first link, it is indicated that the link quality of the mobile network communication link is lower than the link quality of the WIFI network communication link.

In operation 306, the mobile network communication link is determined as a data transmission link, namely the second link corresponding to a mobile network is determined as the transmission link.

In operation 307, the WIFI network communication link is determined as the data transmission link.

In the embodiment, whether to transmit the data through one link or transmit the data through two links may be determined at first according to a magnitude of the data volume of the data to be transmitted, and when the data is determined to be transmitted through one link, the link with higher signal quality is preferably selected as the transmission link, so that resources of the mobile network and the WIFI network accessed by the UAV may be fused better, the problem of relatively low data transmission performance caused by data transmission between the UAV and the UAV controller through the WIFI network in the related art is solved, and data transmission performance of the UAV is improved.

Figure 4:
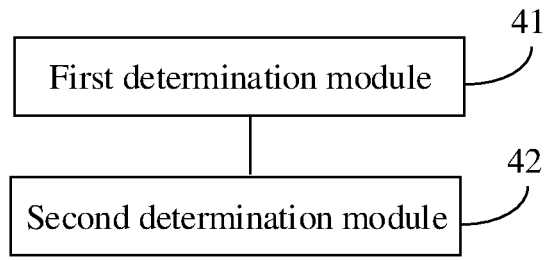
FIG. 4 is a block diagram of a data transmission apparatus, according to an exemplary embodiment.

FIG. 4 is a block diagram of a data transmission apparatus, according to an exemplary embodiment. As shown in FIG. 4, the data transmission apparatus includes:

a first determination module 41, configured to determine link quality of a first link between a UAV and a UAV controller, link quality of a second link between the UAV and a base station, and link quality of a third link between the base station and the UAV controller, the first link being a WIFI network communication link and each of the second link and the third link being a mobile network communication link; and a second determination module 42, configured to determine one or more data transmission links based on the link quality of the first link, the link quality of the second link and the link quality of the third link.

In the embodiment, the UAV may dynamically regulate the one or more data transmission links to send the data to be transmitted based on the link quality of the first link between the UAV and the UAV controller, the link quality of the second link between the UAV and the base station. and the link quality of the third link between the base station and the UAV controller, so that resources of the mobile network and the WIFI network accessed by the UAV may be fused better, and the problem of relatively low data transmission performance caused by data transmission between the UAV and the UAV controller through the WIFI network in the related art is solved.

Figure 5:
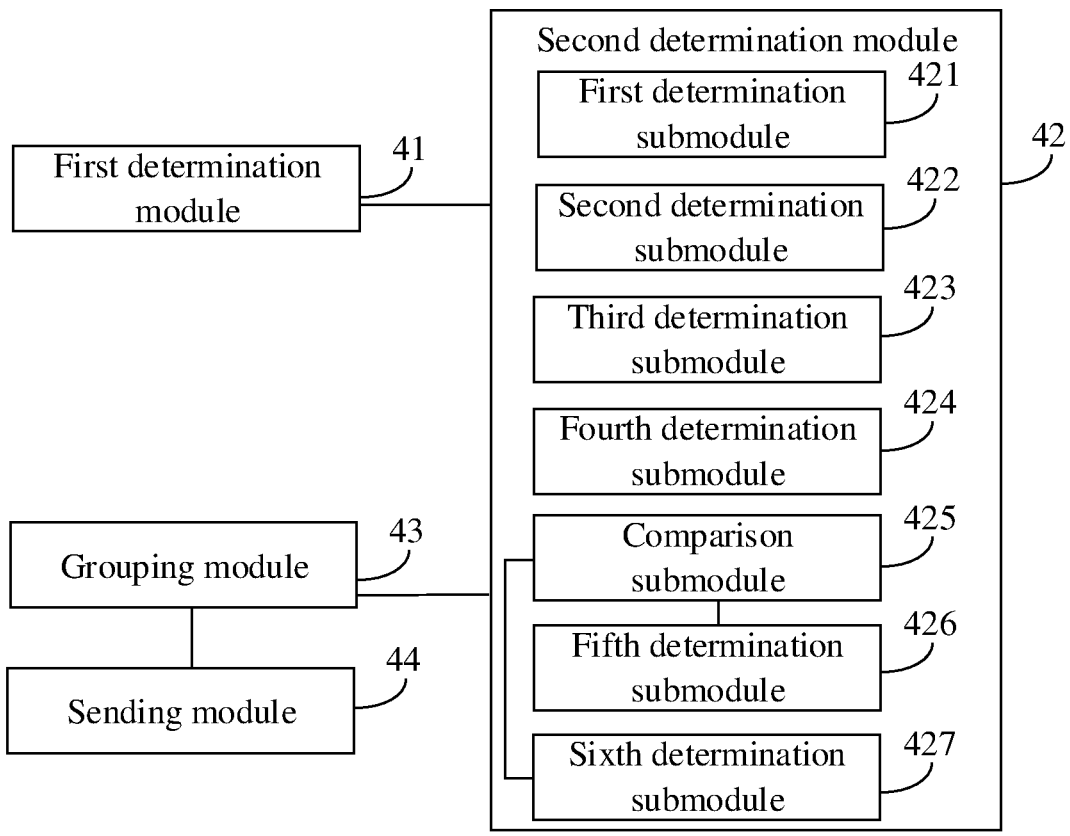
FIG. 5 is a block diagram of another data transmission apparatus, according to an exemplary embodiment.

FIG. 5 is a block diagram of another data transmission apparatus, according to an exemplary embodiment. As shown in FIG. 5, based on the embodiment shown in FIG. 4, in an embodiment, the second determination module 42 includes:

a first determination submodule 421, configured to, when the link quality of the first link is greater than a first threshold, determine the WIFI network communication link as the data transmission link;

a second determination submodule 422, configured to, when the link quality of the first link is less than the first threshold and greater than a second threshold, the link quality of the second link is greater than a third threshold and not greater than a fourth threshold and the link quality of the third link is greater than a fifth threshold and not greater than a sixth threshold, determine the WIFI network communication link and the mobile network communication link as the data transmission links; and a third determination submodule 423, configured to, when the link quality of the first link is less than the second threshold, the link quality of the second link is greater than the fourth threshold and the link quality of the third link is greater than the sixth threshold, determine the mobile network communication link as the data transmission link.

In the embodiment, the transmission link for data transmission of the UAV is regulated according to the link quality of the first link, the link quality of the second link and the link quality of the third link, so that it may be ensured that the UAV may transmit the data through the best network, and data transmission performance of the UAV may be effectively improved.

In an embodiment, the first threshold, the second threshold, the third threshold, the fourth threshold, the fifth threshold, and the sixth threshold are set by the base station; or, the first threshold, the second threshold, the third threshold, the fourth threshold, the fifth threshold, and the sixth threshold are set by the UAV controller.

In the embodiment, a manner for acquiring each threshold for the UAV is disclosed, and each threshold may be set and indicated to the UAV by the base station and the UAV controller.

In an embodiment, the second determination module 42 includes:

a fourth determination submodule 424, configured to, when a data volume of data to be transmitted is greater than a first volume threshold, determine the WIFI network communication link and the mobile network communication link as such data transmission links;

a comparison submodule 425, configured to, when the data volume of the data to be transmitted is not greater than the first volume threshold, compare the link quality of the first link, the second link, and the third link;

a fifth determination submodule 426, configured to, when both of the link quality of the second link and the link quality of the third link are greater than or equal to the link quality of the first link, determine the mobile network communication link as the data transmission link; and a sixth determination submodule 427, configured to, when at least one of the link quality of the second link and the link quality of the third link is not greater than or equal to the link quality of the first link, determine the WIFI network communication link as the data transmission link.

In the embodiment, whether to transmit the data through one link or transmit the data through two links may be determined at first according to a magnitude of the data volume of the data to be transmitted, and when the data is determined to be transmitted through one link, the link with higher signal quality is preferably selected as the transmission link, so that the resources of the mobile network and the WIFI network accessed by the UAV may be fused better, the problem of relatively low data transmission performance caused by data transmission between the UAV and the UAV controller through the WIFI network in the related art is solved, and the data transmission performance of the UAV is improved.

In an embodiment, the apparatus further includes:

a grouping module 43, configured to, when the WIFI network communication link and the mobile network communication link are determined as the data transmission links, divide the data to be transmitted into two sets of data according to a set proportion; and a sending module 44, configured to send one set of the two sets of data to the UAV controller through the first link and send another set of the two sets of data to the base station through the second link for the base station to further send the another set of the two sets of data to the UAV controller through the third link.

In an embodiment, the set proportion is set by the UAV controller.

In the embodiment, an implementation mode for that, when the data is transmitted through two links, i.e., the WIFI network communication link and the mobile network communication link, the data to be transmitted is divided into two sets and the data of the two sets is transmitted through the WIFI network communication link and the mobile network communication link respectively is disclosed.

In an embodiment, the first determination module 41 is configured to receive the link quality of the third link from the UAV controller.

In the embodiment, a manner for acquiring the link quality of the third link between the UAV controller and the base station by the UAV is disclosed, namely the link quality of the third link may be acquired from the UAV controller.

With respect to the apparatus in the above embodiment, the specific manners for performing operations for individual modules therein have been described in detail in the embodiment regarding the method, which will not be elaborated herein.

Figure 6:
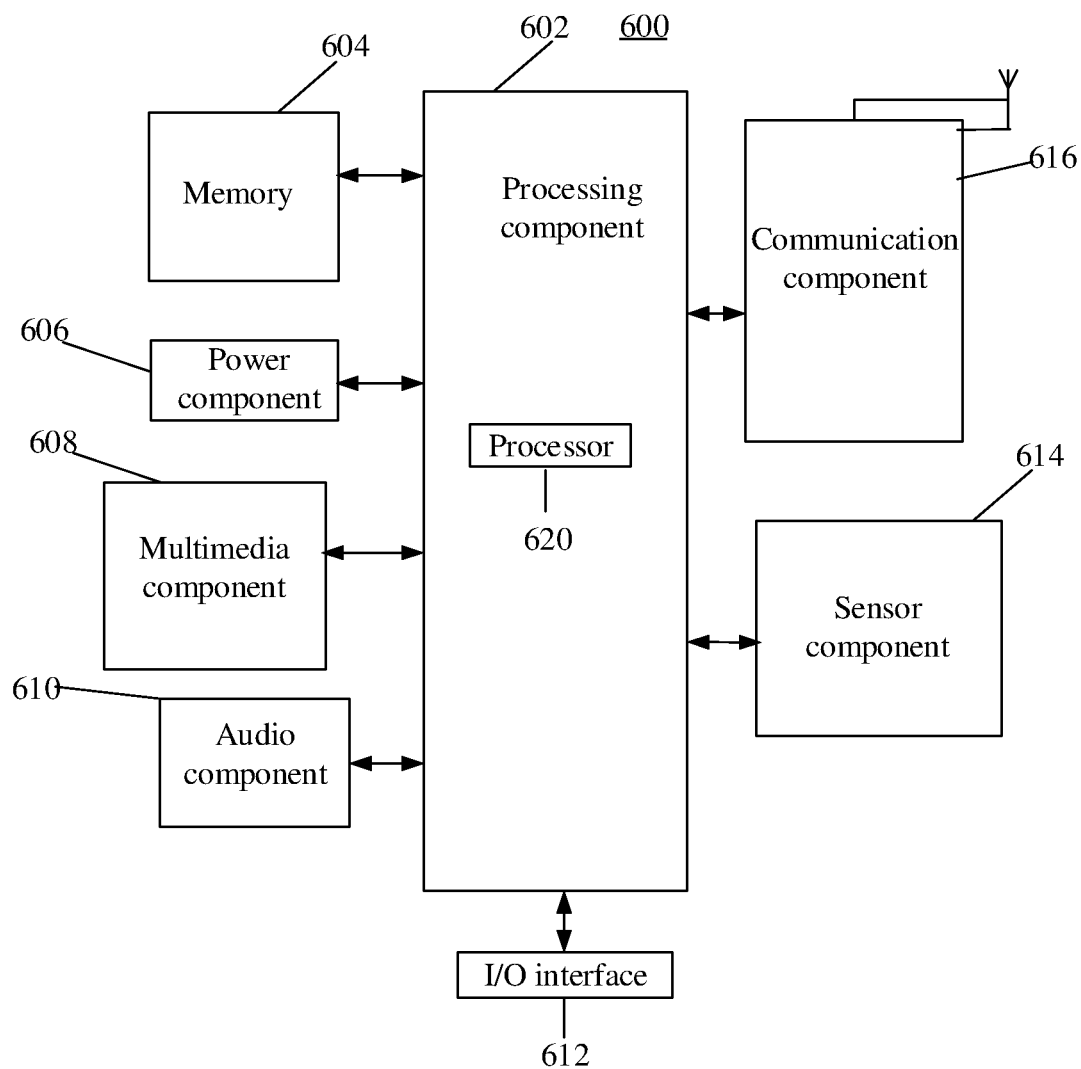
FIG. 6 is a block diagram of a device applied to data transmission, according to an exemplary embodiment.

FIG. 6 is a block diagram of a device applied to data transmission, according to an exemplary embodiment. For example, the device 600 may be a UAV.

Referring to FIG. 6, the device 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the abovementioned method. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 provides power for various components of the device 600. The power component 606 may include a power management system, one or more power supplies, and other components associated with generation, management and distribution of power for the device 600.

The multimedia component 608 includes a screen providing an output interface between the device 600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a Microphone (MIC), and the MIC is configured to receive an external audio signal when the device 600 is in the operation mode, such as a call mode, a recording mode and a voice recognition mode. The received audio signal may further be stored in the memory 604 or sent through the communication component 616. In some embodiments, the audio component 610 further includes a speaker configured to output the audio signal.

The I/O interface 612 provides an interface between the processing component 602 and a peripheral interface module, and the peripheral interface module may be a keyboard, a click wheel, a button and the like. The button may include, but not limited to: a home button, a volume button, a starting button and a locking button.

The sensor component 614 includes one or more sensors configured to provide status assessment in various aspects for the device 600. For instance, the sensor component 614 may detect an on/off status of the device 600 and relative positioning of components, such as a display and small keyboard of the device 600, and the sensor component 614 may further detect a change in a position of the device 600 or a component of the device 600, presence or absence of contact between the user and the device 600, orientation or acceleration/deceleration of the device 600 and a change in temperature of the device 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wired or wireless communication between the device 600 and another device. The device 600 may access a communication-standard-based wireless network, such as a WIFI network, a 2nd-Generation (2G) or 3rd-Generation (3G) network or a combination thereof. In an exemplary embodiment, the communication component 616 receives a broadcast signal or broadcast associated information from an external broadcast management system through a broadcast channel. In an exemplary embodiment, the communication component 616 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 604 including instructions, and the instructions may be executed by the processor 620 of the device 600 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The processor 620 is configured to:

determine link quality of a first link between a UAV and a UAV controller, link quality of a second link between the UAV and a base station, and link quality of a third link between the base station and the UAV controller, the first link being a WIFI network communication link and each of the second link and the third link being a mobile network communication link; and determine one or more data transmission links based on the link quality of the first link, the link quality of the second link and the link quality of the third link.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A data transmission method, comprising:
   determining link quality of a first link between an unmanned aerial vehicle (UAV) and a UAV controller, link quality of a second link between the UAV and a base station, and link quality of a third link between the base station and the UAV controller, wherein the first link is a Wireless-Fidelity (WIFI) network communication link and each of the second link and the third link is a mobile network communication link; and
   determining one or more data transmission links for data to be transmitted based on the link quality of the first link, the link quality of the second link, and the link quality of the third link,
   wherein determining the one or more data transmission links for the data to be transmitted based on the link quality of the first link, the link quality of the second link, and the link quality of the third link comprises:
   when a data volume of the data to be transmitted is greater than a first volume threshold, determining the WIFI network communication link and the mobile network communication link as the one or more data transmission links;
   when the data volume of the data to be transmitted is not greater than the first volume threshold, comparing the link quality of the first link, the link quality of the second link, and the link quality of the third link;
   when both of the link quality of the second link and the link quality of the third link are greater than or equal to the link quality of the first link, determining the mobile network communication link as the one or more data transmission links; and
   when at least one of the link quality of the second link or the link quality of the third link is not greater than or equal to the link quality of the first link, determining the WIFI network communication link as the one or more data transmission links.

2. The method of claim 1, wherein determining the one or more data transmission links for the data to be transmitted based on the link quality of the first link, the link quality of the second link, and the link quality of the third link further comprises:
   when the link quality of the first link is greater than a first threshold, determining the WIFI network communication link as the one or more data transmission links;
   when the link quality of the first link is less than the first threshold and greater than a second threshold, the link quality of the second link is greater than a third threshold and not greater than a fourth threshold, and the link quality of the third link is greater than a fifth threshold and not greater than a sixth threshold, determining the WIFI network communication link and the mobile network communication link as the one or more data transmission links; and
   when the link quality of the first link is less than the second threshold, the link quality of the second link is greater than the fourth threshold, and the link quality of the third link is greater than the sixth threshold, determining the mobile network communication link as the one or more data transmission links.

3. The method of claim 2, wherein the first threshold, the second threshold, the third threshold, the fourth threshold, the fifth threshold, and the sixth threshold are set by at least one of the base station or the UAV controller.

4. The method of claim 2, further comprising:
   when the WIFI network communication link and the mobile network communication link are determined as the one or more data transmission links, dividing the data to be transmitted into first and second sets of data according to a set proportion; and
   sending the first set of data to the UAV controller through the first link, and sending the second set of data to the base station through the second link so that the base station further sends the second set of data to the UAV controller through the third link.

5. The method of claim 4, wherein the set proportion is set by the UAV controller.

6. The method of claim 1, wherein determining the link quality of the third link between the base station and the UAV controller comprises:
   receiving the link quality of the third link from the UAV controller.

7. An unmanned aerial vehicle (UAV), comprising:
   a processor; and
   a memory storing instructions executable by the processor,
   wherein the processor is configured to:
   determine link quality of a first link between the UAV and a UAV controller, link quality of a second link between the UAV and a base station, and link quality of a third link between the base station and the UAV controller, wherein the first link is a Wireless-Fidelity (WIFI) network communication link and each of the second link and the third link is a mobile network communication link; and
   determine one or more data transmission links based on the link quality of the first link, the link quality of the second link, and the link quality of the third link,
   wherein in determining the one or more data transmission links based on the link quality of the first link, the link quality of the second link, and the link quality of the third link, the processor is further configured to:
   when a data volume of the data to be transmitted is greater than a first volume threshold, determine the WIFI network communication link and the mobile network communication link as the one or more data transmission links;
   when the data volume of the data to be transmitted is not greater than the first volume threshold, compare the link quality of the first link, the link quality of the second link, and the link quality of the third link;
   when both of the link quality of the second link and the link quality of the third link are greater than or equal to the link quality of the first link, determine the mobile network communication link as the one or more data transmission links; and
   when at least one of the link quality of the second link or the link quality of the third link is not greater than or equal to the link quality of the first link, determine the WIFI network communication link as the one or more data transmission links.

8. The UAV of claim 7, wherein the processor is further configured to:
 when the link quality of the first link is greater than a first threshold, determine the WIFI network communication link as the one or more data transmission links;
 when the link quality of the first link is less than the first threshold and greater than a second threshold, the link quality of the second link is greater than a third threshold and not greater than a fourth threshold, and the link quality of the third link is greater than a fifth threshold and not greater than a sixth threshold, determine the WIFI network communication link and the mobile network communication link as the one or more data transmission links; and
 when the link quality of the first link is less than the second threshold, the link quality of the second link is greater than the fourth threshold, and the link quality of the third link is greater than the sixth threshold, determine the mobile network communication link as the one or more data transmission links.

9. The UAV of claim 8, wherein the first threshold, the second threshold, the third threshold, the fourth threshold, the fifth threshold, and the sixth threshold are set by at least one of the base station or the UAV controller.

10. The UAV of claim 8, wherein the processor is further configured to:
 when the WIFI network communication link and the mobile network communication link are determined as the one or more data transmission links, divide the data to be transmitted into first and second sets of data according to a set proportion; and
 send the first set of data to the UAV controller through the first link and send the second set of data to the base station through the second link so that the base station further sends the second set of data to the UAV controller through the third link.

11. The UAV of claim 10, wherein the set proportion is set by the UAV controller.

12. The UAV of claim 7, wherein the processor is further configured to receive the link quality of the third link from the UAV controller.

13. A non-transitory computer-readable storage medium having stored therein instructions that, when executed by a processor of an unmanned aerial vehicle (UAV), cause the UAV to perform a data transmission method, the method comprising:
 determining link quality of a first link between the UAV and a UAV controller, link quality of a second link between the UAV and a base station, and link quality of a third link between the base station and the UAV controller, wherein the first link is a Wireless-Fidelity (WIFI) network communication link and each of the second link and the third link is a mobile network communication link; and
 determining one or more data transmission links based on the link quality of the first link, the link quality of the second link, and the link quality of the third link,
 wherein determining the one or more data transmission links for the data to be transmitted based on the link quality of the first link, the link quality of the second link, and the link quality of the third link comprises:
 when a data volume of the data to be transmitted is greater than a first volume threshold, determining the WIFI network communication link and the mobile network communication link as the one or more data transmission links;
 when the data volume of the data to be transmitted is not greater than the first volume threshold, comparing the link quality of the first link, the link quality of the second link, and the link quality of the third link;
 when both of the link quality of the second link and the link quality of the third link are greater than or equal to the link quality of the first link, determining the mobile network communication link as the one or more data transmission links; and
 when at least one of the link quality of the second link or the link quality of the third link is not greater than or equal to the link quality of the first link, determining the WIFI network communication link as the one or more data transmission links.

14. The non-transitory computer-readable storage medium of claim 13, wherein determining the one or more data transmission links for the data to be transmitted based on the link quality of the first link, the link quality of the second link, and the link quality of the third link further comprises:
 when the link quality of the first link is greater than a first threshold, determining the WIFI network communication link as the one or more data transmission links;
 when the link quality of the first link is less than the first threshold and greater than a second threshold, the link quality of the second link is greater than a third threshold and not greater than a fourth threshold, and the link quality of the third link is greater than a fifth threshold and not greater than a sixth threshold, determining the WIFI network communication link and the mobile network communication link as the one or more data transmission links; and
 when the link quality of the first link is less than the second threshold, the link quality of the second link is greater than the fourth threshold, and the link quality of the third link is greater than the sixth threshold, determining the mobile network communication link as the one or more data transmission links.

15. The non-transitory computer-readable storage medium of claim 14, wherein the first threshold, the second threshold, the third threshold, the fourth threshold, the fifth threshold, and the sixth threshold are set by at least one of the base station or the UAV controller.

16. The non-transitory computer-readable storage medium of claim 14, wherein the method further comprises:
 when the WIFI network communication link and the mobile network communication link are determined as the one or more data transmission links, dividing the data to be transmitted into first and second sets of data according to a set proportion; and
 sending the first set of data to the UAV controller through the first link, and sending the second set of data to the base station through the second link so that the base station further sends the second set of data to the UAV controller through the third link.

17. The non-transitory computer-readable storage medium of claim 16, wherein the set proportion is set by the UAV controller.

* * * * *